United States Patent
Vashisht et al.

(10) Patent No.: US 10,552,610 B1
(45) Date of Patent: Feb. 4, 2020

(54) ADAPTIVE VIRTUAL MACHINE SNAPSHOT UPDATE FRAMEWORK FOR MALWARE BEHAVIORAL ANALYSIS

(71) Applicant: FireEye, Inc., Milpitas, CA (US)

(72) Inventors: Sai Omkar Vashisht, Milpitas, CA (US); Phung-Te Ha, Milpitas, CA (US); Sushant Paithane, Maharashtra (IN); Sumer Deshpande, Milpitas, CA (US)

(73) Assignee: FireEye, Inc., Milipitas, CA (US)

( * ) Notice: Subject to any disclaimer, the term of this patent is extended or adjusted under 35 U.S.C. 154(b) by 38 days.

(21) Appl. No.: 15/627,272

(22) Filed: Jun. 19, 2017

Related U.S. Application Data

(60) Provisional application No. 62/438,306, filed on Dec. 22, 2016.

(51) Int. Cl.
  *G06F 12/14* (2006.01)
  *G06F 21/56* (2013.01)
  (Continued)

(52) U.S. Cl.
  CPC ............ *G06F 21/566* (2013.01); *G06F 3/065* (2013.01); *G06F 3/0619* (2013.01);
  (Continued)

(58) Field of Classification Search
  CPC ................................ G06F 21/566; G06F 3/065
  (Continued)

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

Venezia, Paul, "NetDetector Captures Intrusions", InfoWorld Issue 27, ("Venezia"), (Jul. 14, 2003).

(Continued)

*Primary Examiner* — Haresh N Patel
(74) *Attorney, Agent, or Firm* — Rutan & Tucker, LLP

(57) ABSTRACT

A method for updating a virtual machine disk snapshot for use in instantiating one or more virtual guest instances for malware detection is described. The method features (i) detecting a guest image update package that includes information for updating one or more software components included as part of the virtual machine disk snapshot, and (ii) determining whether the guest image update package is currently contained in a contiguous storage area that is part of the virtual machine disk snapshot. Responsive to determining that the guest image update package is more recent than content currently contained in the contiguous storage area, the guest image update package is inserted into the contiguous storage area that is part of the virtual machine disk snapshot to generate a revised virtual machine disk snapshot that includes the one or more updated software components.

22 Claims, 5 Drawing Sheets

(51) Int. Cl.
*G06F 9/455* (2018.01)
*G06F 3/06* (2006.01)
(52) U.S. Cl.
CPC .......... *G06F 3/0665* (2013.01); *G06F 3/0689* (2013.01); *G06F 9/45558* (2013.01); *G06F 2009/45562* (2013.01); *G06F 2009/45583* (2013.01); *G06F 2009/45587* (2013.01); *G06F 2221/034* (2013.01)
(58) Field of Classification Search
USPC ......................................................... 726/23
See application file for complete search history.

(56) References Cited

U.S. PATENT DOCUMENTS

| | | |
|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |

(56) References Cited

U.S. PATENT DOCUMENTS

| | | | |
|---|---|---|---|
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,734,016 B2 * | 8/2017 | Tsirkin ............... G06F 11/1451 709/226 |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |

(56) References Cited

U.S. PATENT DOCUMENTS

| | | |
|---|---|---|
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |

(56) References Cited

U.S. PATENT DOCUMENTS

| | | |
|---|---|---|
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | Fitzgerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189697 A1* | 8/2008 | Kachroo ............ G06F 8/65 717/171 |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0055604 A1* | 2/2009 | Lemar ............ G06F 11/1435 711/161 |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |

(56) References Cited

U.S. PATENT DOCUMENTS

| | | |
|---|---|---|
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0059228 A1* | 2/2014 | Parikh ............... G06F 9/5005 |
| 2014/0089265 A1* | 3/2014 | Talagala ......... G06F 17/30551 707/674 |
| 2014/0130158 A1 | 5/2014 | Wang et al. |
| 2014/0137180 A1 | 5/2014 | Lukacs et al. |
| 2014/0149695 A1* | 5/2014 | Zaslaysky ........... G06F 12/16 711/162 |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0282606 A1* | 9/2014 | Clark ................. G06F 9/461 718/108 |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0081994 A1* | 3/2015 | Christopher ........ G06F 11/1458 711/162 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2016/0342609 A1* | 11/2016 | Jibbe ................. G06F 17/30088 709/226 |
| 2017/0076092 A1* | 3/2017 | Kashyap ............. G06F 9/45533 709/226 |
| 2017/0083703 A1 | 3/2017 | Abbasi et al. |
| 2017/0147819 A1* | 5/2017 | Vasilenko ............ G06F 21/566 709/226 |
| 2017/0220777 A1* | 8/2017 | Wang ................. G06F 21/105 709/226 |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

(56) References Cited

OTHER PUBLICATIONS

Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/.about.chris/research/doc/esec07.sub.—mining.pdf- . p. 1.
"Network Security: NetDetector—Network Intrusion Forensic System (NIFS) Whitepaper", ("NetDetector Whitepaper"), (2003). p. 1.
"When Virtual is Better Than Real", IEEEXplore Digital Library, available at, http://ieeexplore.ieee.org/xpl/articleDetails.iso?reload=true&amumber=990073, (Dec. 7, 2013) p. 1.
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003), p. 1.
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006. p. 1.
Baecher, "The Nepenthes Platform: An Efficient Approach to collect Malware", Springer-verlaq Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003). p. 1.
Chahaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001). p. 1.
Cisco "Intrusion Prevention for the Cisco ASA 5500-x Series" Data Sheet (2012) p. 1.
Cohen, M.I., "PyFlag—An advanced network forensic framework", Digital investigation 5, Elsevier, (2008), pp. S112-S120. p. 1.
Costa, M., et al., "Vigilante: End-to-End Containment of Internet Worms", SOSP '05, Association for Computing Machinery, Inc., Brighton U.K., (Oct. 23-26, 2005). p. 1.
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14. p. 1.
Distler, "Malware Analysis: An Introduction", SANS Institute InfoSec Reading Room, SANS Institute, (2007). p. 1.
Dunlap, George W., et al., "ReVirt: Enabling Intrusion Analysis through Virtual-Machine Logging and Replay", Proceeding of the 5th Symposium on Operating Systems Design and Implementation, USENIX Association, "Dunlap"), (Dec. 9, 2002).
FireEye Malware Analysis & Exchange Network, Malware Protection System, FireEye Inc., 2010. p. 1.
FireEye Malware Analysis, Modern Malware Forensics, FireEye Inc., 2010. p. 1.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016]. p. 1.
Heng Yin et al, Panorama: Capturing System-Wide Information Flow for Malware Detection and Analysis, Research Showcase @ CMU, Carnegie Mellon University, 2007. p. 1.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University. p. 1.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011. p. 1.
Kaeo, Merike, "Designing Network Security", ("Kaeo"), (Nov. 2003). p. 1.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003) p. 1.
Kreibich, C., et al., "Honeycomb-Creating Intrusion Detection Signatures Using Honeypots", 2nd Workshop on Hot Topics in Networks (HotNets-11), Boston, USA, (2003). p. 1.
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., a VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001). p. 1.
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., "'Analyzing and exploiting network behaviors of malware.'", Security and Privacy in Communication Networks. Springer Berlin Heidelberg, 2010. 20-34. p. 1.
Mori, Detecting Unknown Computer Viruses, 2004, Springer-Verlag Berlin Heidelberg. p. 1.
Natvig, Kurt, "Sandboxii: Internet", Virus Bulletin Conference, ("Natvig"), (Sep. 2002). p. 1.
NetBIOS Working Group. Protocol Standard for a NetBIOS Service on a TCP/UDP transport: Concepts and Methods. STD 19, RFC 1001, Mar. 1987. p. 1.

(56) References Cited

OTHER PUBLICATIONS

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005). p. 1.

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA. p. 1.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer"). p. 1.

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004). p. 1.

Thomas H. Ptacek, and Timothy N. Newsham, "Insertion, Evasion, and Denial of Service: Eluding Network Intrusion Detection", Secure Networks, ("Ptacek"), (Jan. 1998). p. 1.

\* cited by examiner

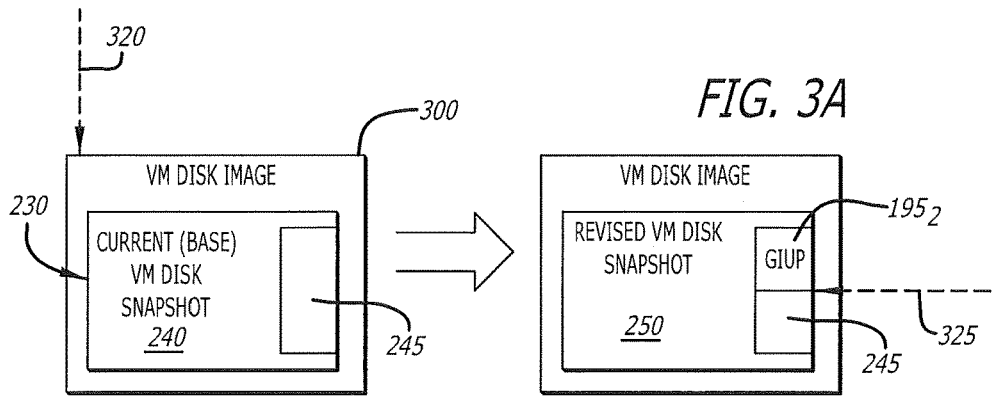
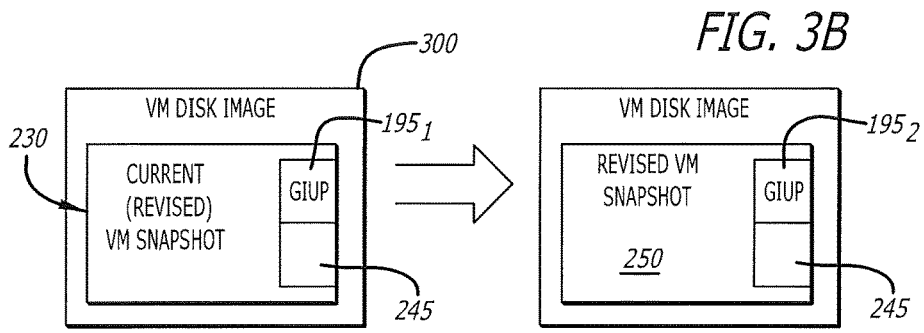
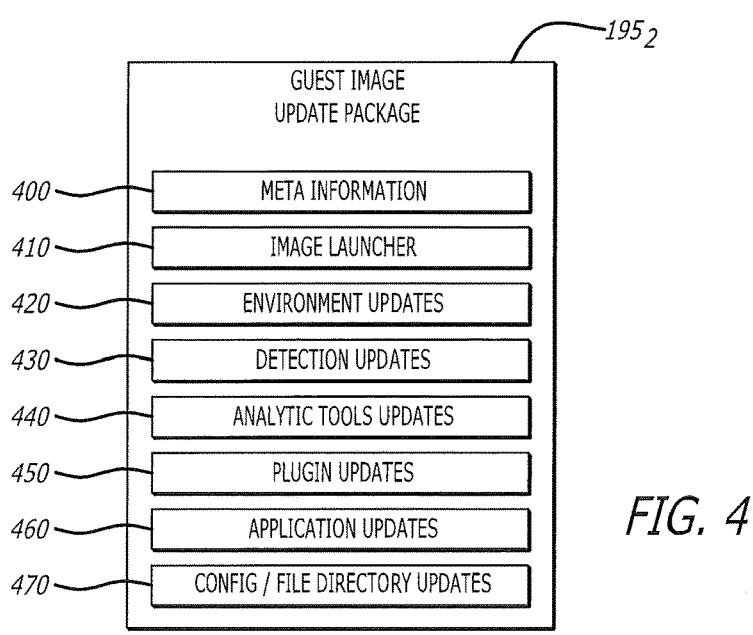

ADAPTIVE VIRTUAL MACHINE SNAPSHOT UPDATE FRAMEWORK FOR MALWARE BEHAVIORAL ANALYSIS

CROSS-REFERENCE TO RELATED APPLICATIONS

This application claims the benefit of priority on U.S. Provisional Application No. 62/438,306 filed Dec. 22, 2016, the entire contents of which are incorporated by reference herein.

FIELD

Embodiments of the disclosure relate to cyber security. More particularly, one embodiment of the disclosure relates to a system and method for updating a virtual machine (VM) disk snapshot that is used in the instantiation of one or more guest virtual machine instances for handling the analysis of an object for a presence of malware.

GENERAL BACKGROUND

Malware detection systems often employ virtual environments that enable potentially malicious objects to be safely analyzed during run-time in one or more virtual machines. Each virtual machine (VM) includes a guest VM and a host VM. The guest VM is a component that functions as if it were a physical network device and the host VM is the underlying hardware that provides computing resources such as processing power, data storage, and I/O (input/output). The guest VM may be instantiated by a virtual system (disk) image at run-time. To expedite activation of a guest VM instance, the virtual disk image may include a VM disk snapshot, namely an image that includes the runtime state of pre-launched software components of the guest VM, including applications, plugins and analytic tools.

As new software components or new versions of these software components are released by software vendors, new instrumented VM disk snapshots need to be developed and tested for these software components. Since updating a VM disk snapshot is a significant event, as the entire virtual disk image must be recompiled for each software component due to the monolithic configuration of the VM disk snapshot, the generation of an updated (new) VM disk snapshot often requires months of development and quality assurance testing before release.

Given the amount of time necessary to complete a newly-instrumented VM disk snapshot, some malware authors have a lengthy window of time for their malware to exploit certain unknown vulnerabilities of a newly released software component before addressed by a newly released VM disk snapshot. By reducing this window of time, spanning from the release of the software component to deployment of a new VM disk snapshot that addresses malware that may have evaded prior malware detection or eliminates a discovered vulnerability in that software component, the harmful effects of malware may be reduced.

Also, given that certain software components of a VM disk snapshot are more often utilized in malware detection than other software components, these certain software components are more important for malware detection (e.g., applications, plugins, malware detection components, etc.). As a result, in order to maintain a high level of success in malware detection, certain software components may need to be updated more frequently than others. Additionally, as more and more customers are requesting customized VM disk snapshots (e.g., VM disk snapshots that include customer-specific software components), the timely generation of updated VM disk snapshots has been more difficult to achieve.

Lastly, independent of the substantial time lag in creating VM disk snapshots to address evasive actions untaken by malware and/or logical issues with the VM disk image that are uncovered after its release, the transmission (including by online update) of these extremely large VM disk snapshots is expensive to maintain. A technique of increasing the efficiency in updating VM disk snapshots is needed.

BRIEF DESCRIPTION OF THE DRAWINGS

Embodiments of the disclosure are illustrated by way of example and not by way of limitation in the figures of the accompanying drawings, in which like references indicate similar elements and in which:

FIGS. 3A-3B are exemplary embodiments illustrating logic within a network device that controls the modification of a virtual machine (VM) disk image that includes a current or revised VM disk snapshot with a guest image update package.

FIG. 4 is an exemplary embodiment of a logical representation of the guest image update package of FIG. 3.

DETAILED DESCRIPTION

Figure 1:
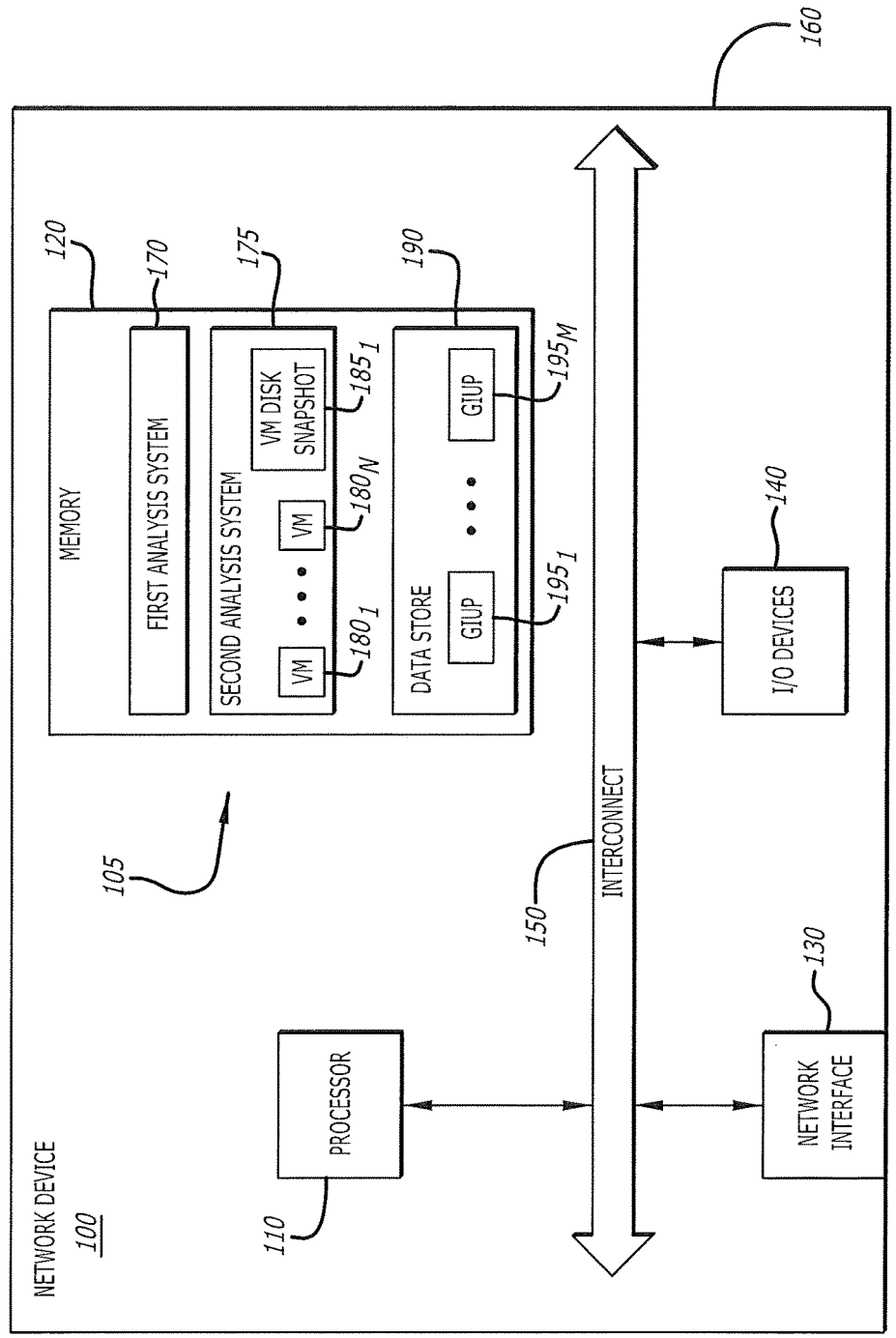
FIG. 1 is an exemplary block diagram of a general, physical representation of a network device supporting a virtualized malware detection environment.

A new system framework is employed that allows VM disk snapshots within the VM disk image to be updated during run-time without requiring substitution of the entire VM disk image. Rather than a conventional, monolithic configuration in which functionality of different software components are highly intertwined, the VM disk snapshot features a modular configuration where different portions (modules) of the VM disk snapshot may be updated in accordance with a time-based update scheme and/or a frequency-based update scheme.

I. Overview Summary

As described below, one embodiment of the system framework relies on a modular VM disk image, which features a base VM disk snapshot that includes a runtime state of pre-launched software components (e.g., applications, plugins, malware detection components, analytic tools, etc.) such as (i) the current state information of a file system to be utilized by a guest VM instance instantiated using the base VM disk snapshot, and (ii) the state information of content and settings within memory allocated for at least the guest VM instance. The advantage in deployment of a VM disk snapshot is to reduce initial processing time by starting the VM at a prescribed, advanced state when used to detect a cyber-attack.

Unlike conventional VM disk snapshots, as described below, a VM disk snapshot further includes a contiguous storage area that is part of the VM disk snapshot (e.g., an area of a file system of the VM disk snapshot that is operating as a memory area), which is referred to herein as "contiguous storage area." The contiguous storage area is modifiable and configured for receipt of a guest image update package that may be provided to a network device supporting the system framework subsequent to receipt of the base VM disk snapshot. The contiguous storage area may be empty or may include a default file that would be partially or entirely overwritten by a first guest image update package to produce a "revised" VM disk snapshot. Similarly, the contents of the contiguous storage area within the revised VM disk snapshot may be overwritten by a subsequent (second) guest image update package to generate another revised VM disk snapshot. Such revisions may be iterative until a new VM disk image is made available to the network device. Of course, in lieu of overwriting the prior guest image update packages within a revised VM disk snapshot, any incoming guest image update package may be simply added to the (base) VM disk snapshot. More specifically, at run-time, upon determining that a guest image update package is available to the network device and has not been placed within the current (base or revised) VM disk snapshot, a virtual execution engine combines the guest image update package with the current VM disk snapshot to produce a revised VM disk snapshot. The revised VM disk snapshot may be loaded into memory and used for subsequent instantiation of guest VM instances for analysis of objects for malware until the virtual execution process is restarted. Likewise, upon determining that the guest image update package is available to the network device but has already been added to the base VM disk snapshot within the current VM disk snapshot, no revision is necessary and the current (revised) VM disk snapshot is used for instantiation of the guest VM instances.

According to one embodiment of the disclosure, the guest image update package may include an image launcher, namely the software component that, when executed during run-time, controls operations for adding one or more new software components and/or updating current software components within the base VM disk snapshot to create a revised VM disk snapshot. The guest image update package further includes (i) references to the updated software components (or the updated software components themselves) and (ii) meta information that provides rules of operation for the image launcher in substituting certain software components within the resultant guest VM instance with the updated software components. The updated software components may modify certain functionality of the base VM disk snapshot, including any or all of the following software component categories: environment features; detection components; analytic components; plugins; and/or applications.

Further, at runtime when an object is available for dynamic analysis, the guest VM instance is instantiated using the revised VM disk snapshot where an update package processor, part of the software components of the base VM disk snapshot installed during instantiation of the guest VM instance, is installed within as part of the guest VM instance. Thereafter, upon activation, the update package processor monitors a prescribed location of the revised VM disk snapshot for a new guest image update package. In response to detecting the new guest image update package, the update package processor creates a mounted directory (or virtualized disk) of the software component updates within that guest image update package for storage in a virtual file system of the guest VM instance. This "mounted directory" points to a mounted logical (virtual) disk that contains the update software components. Of course, it is contemplated that the update package could be configured in a format other than virtualized disk for performance reasons.

The update package processor further coordinates installation of the image launcher that is configured to obtain the meta information that is part of the guest image update package. During processing of the stored meta information, the image launcher accesses content within the mounted directory (or virtualized disk) to locate certain update information (e.g., application updates, plugin updates, tool updates, detection component updates, etc.) that may be applicable for malware analysis of the object. The image launcher installs the update information to complete instantiation of the guest VM instance.

As a result, since the update package is isolated and has modular processing, the text matrix is reduced. Validation of contents and verification of functionality can be accelerated, especially without the need for recompiling of the entire snapshot. These updated software components correspond to software components that may be compiled as entirely separate binaries. Hence, applications requiring registry changes cannot be updated through the use of guest image update packages because such changes would require a monolithic type of update. Since the VM disk image is modularized, the entire VM disk image does not need to be tested separately, as the updates can be separately tested.

Furthermore, by adding updated software components to the guest VM instance, the virtualized malware detection environment operating as part of the network device may be quickly updated when deficiencies in a prior VM disk snapshot are detected. Also, the amount of network resources needed for transferring the updated software components, instead of the entire VM guest image, may be reduced and the effect on system resources (e.g., new updated software components are simply added by the use of, for example, symbolic links to the prior VM disk snapshot without recompiling the entire VM disk image) may be minimized. A symbolic link is a file that contains a reference to another file or directory in the form of a relative or absolute path name.

Another embodiment of the system framework again relies on a modular VM disk image, which features multiple (two or more) modules with the VM disk snapshot that can be modified by one or more guest image update packages. The update can occur successively or concurrently (performed at least partially at the same time). The modules may include an update of different modules of the base VM disk snapshot that can be segmented by category (e.g., analytic tools, applications, plugins, etc.) and even further segmented by type (e.g., word processing/PDF/web browser applications, version X.1/X.2/X.3 of plugins, etc.). Additionally, the system framework would be configured to determine if a "new" guest image update package is received for each module category. Such a determination would rely on a number of factors. Some of these factors may include, but are not limited or restricted to (1) content (e.g., version number or timestamp) obtain directly from the "new" guest image update package or (2) a representative of a factor that is stored separately from the guest image update package (e.g., within a record in the file system). It is contemplated that the frequency in monitoring for module updates may be uniform for all module types or the monitoring frequency may differ for different module types (e.g., check for updates in a first category of software component (plugins) may be conducted at a higher frequency than second category of software component (application); check for updates in a first type of software component of a selected category (e.g., word processing application) may be conducted at a higher frequency than second software component of that selected category (PDF reader application)).

II. Terminology

In the following description, certain terminology is used to describe various features of the invention. For example, each of the terms "logic," "component" and "engine" may be representative of hardware, firmware or software that is configured to perform one or more functions. As hardware, the term logic (or component or engine) may include circuitry having data processing and/or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

Logic (or component or engine) may be software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component or engine) may be stored in persistent storage.

The term "object" generally relates to content having a logical structure or organization that enables it to be classified for purposes of analysis for malware. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data. The object may be retrieved from information in transit (e.g., a plurality of packets) or information at rest (e.g., data bytes from a storage medium). Examples of different types of objects may include a data element, one or more flows, or a data element within a flow itself.

Herein, a "flow" generally refers to related packets that are received, transmitted, or exchanged within a communication session, where multiple (two or more) flows each being received, transmitted or exchanged within a corresponding communication session is referred to as a "multi-flow". For convenience, a "packet" broadly refers to a series of bits or bytes having a prescribed format. Further, a data element may correspond to a collection of data that may take the form of an individual or a number of packets carrying related payloads, e.g., a single webpage received over a network. A "data element" generally refers to as a plurality of packets carrying related payloads, e.g., a single webpage received over a network. The data element may be an executable or a non-executable, as described above.

The term "computerized" generally represents that any corresponding operations are conducted by hardware in combination with software and/or firmware.

According to one embodiment of the disclosure, the term "malware" may be broadly construed as any code, communication or activity that initiates or furthers a cyber-attack. Malware may prompt or cause unauthorized, anomalous, unintended and/or unwanted behaviors or operations constituting a security compromise of information infrastructure. For instance, malware may correspond to a type of malicious computer code that, as an illustrative example, executes an exploit to take advantage of a vulnerability in a network, network device or software, for example, to gain unauthorized access, harm or co-opt operation of a network device or misappropriate, modify or delete data. Alternatively, as another illustrative example, malware may correspond to information (e.g., executable code, script(s), data, command(s), etc.) that is designed to cause a network device to experience anomalous (unexpected or undesirable) behaviors. The anomalous behaviors may include a communication-based anomaly or an execution-based anomaly, which, for example, could (1) alter the functionality of a network device executing application software in an atypical manner; (2) alter the functionality of the network device executing that application software without any malicious intent; and/or (3) provide unwanted functionality which may be generally acceptable in another context.

The term "network device" should be construed as any electronic device with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, a standalone appliance, a server, a router or other intermediary communication device, a firewall, etc.

The term "file system" may be generally construed as a hierarchical data structure or data structures for the storage of information.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring now to FIG. 1, an exemplary block diagram of a general, physical representation of a network device 100 supporting a virtualized malware detection environment 105 is shown. Herein, the network device 100 comprises a plurality of components, including one or more hardware processors (referred to as "processor") 110, a memory 120, one or more network interfaces (referred to as "network interface") 130, and one or more input/output (I/O) devices (referred to as "I/O device") 140. These components, connected by an interconnect 150 such as a bus for example, are at least partially encased in a housing 160 made entirely or partially of a rigid material (e.g., hardened plastic, metal, glass, composite, or any combination thereof). The housing 160 protects these components from environmental conditions.

The processor 110 is a multi-purpose, programmable component that accepts digital data as input, processes the input data according to stored instructions, and provides results as output. One example of a processor may include an Intel® x86 central processing unit (CPU) with an instruction set architecture. Alternatively, the processor 110 may include another type of CPU, a digital signal processor (DSP), an Application Specific Integrated Circuit (ASIC), a field-programmable gate array (FPGA), or the like. The processor 110 and operating system (OS) 160 within the memory 120 operate as system resources for virtualized hardware that may control operability of one or more virtual machine instances (e.g., VM $180_1$-$180_N$, where N≥1) operating with a dynamic analysis engine 175, described below.

The I/O device 140 may include various I/O or peripheral devices, such as a keyboard, key pad, touch screen, or mouse for example. The network interface 130 may include one or more network ports containing the mechanical, electrical and/or signaling circuitry needed to connect the network device 100 to a network to thereby facilitate communications to other remotely located electronic devices. To that end, the network interface 130 may be configured to transmit and/or receive messages using a variety of communication protocols including, inter alia, Transmission Control Protocol/Internet Protocol (TCP/IP), Hypertext Transfer Protocol (HTTP), or HTTP Secure (HTTPS).

The memory 120 operates as system memory, provided by non-persistent storage or persistent storage. From a logical perspective, the memory 120 includes a plurality of locations that are addressable by the processor 110 and the network interface 130 for storing logic, including a first analysis system 170 and/or a second analysis system 175. If deployed, the first analysis system 170 performs a static analysis of a selected object by analyzing its characteristics (e.g., content, size, name, path, etc.) without execution of the selected object. The second analysis system (also referred to as a "dynamic analysis engine") 175 conducts an analysis of the behaviors of the object during processing within the one or more VMs $180_1$-$180_N$, where at least one of the VMs (e.g., VM $180_1$) may be instantiated with a revised VM disk snapshot $185_1$ described herein. The second analysis system 175 has access to a data store 190 (e.g., virtual file system) that includes at least one, and perhaps multiple (two or more) guest image update packages $195_1$-$195_M$ (M≥1), each includes one or more symbolic links to update information (e.g., new software components not present in the base VM disk snapshot or updated software components present in the base VM disk snapshot) along with meta information that controls the selection and usage of the updated software components, as shown in FIG. 4. The data store 190 may be a file system that is local to the network device 100 or may be remotely located storage that is within another network device or part of a cloud service.

Figure 2:
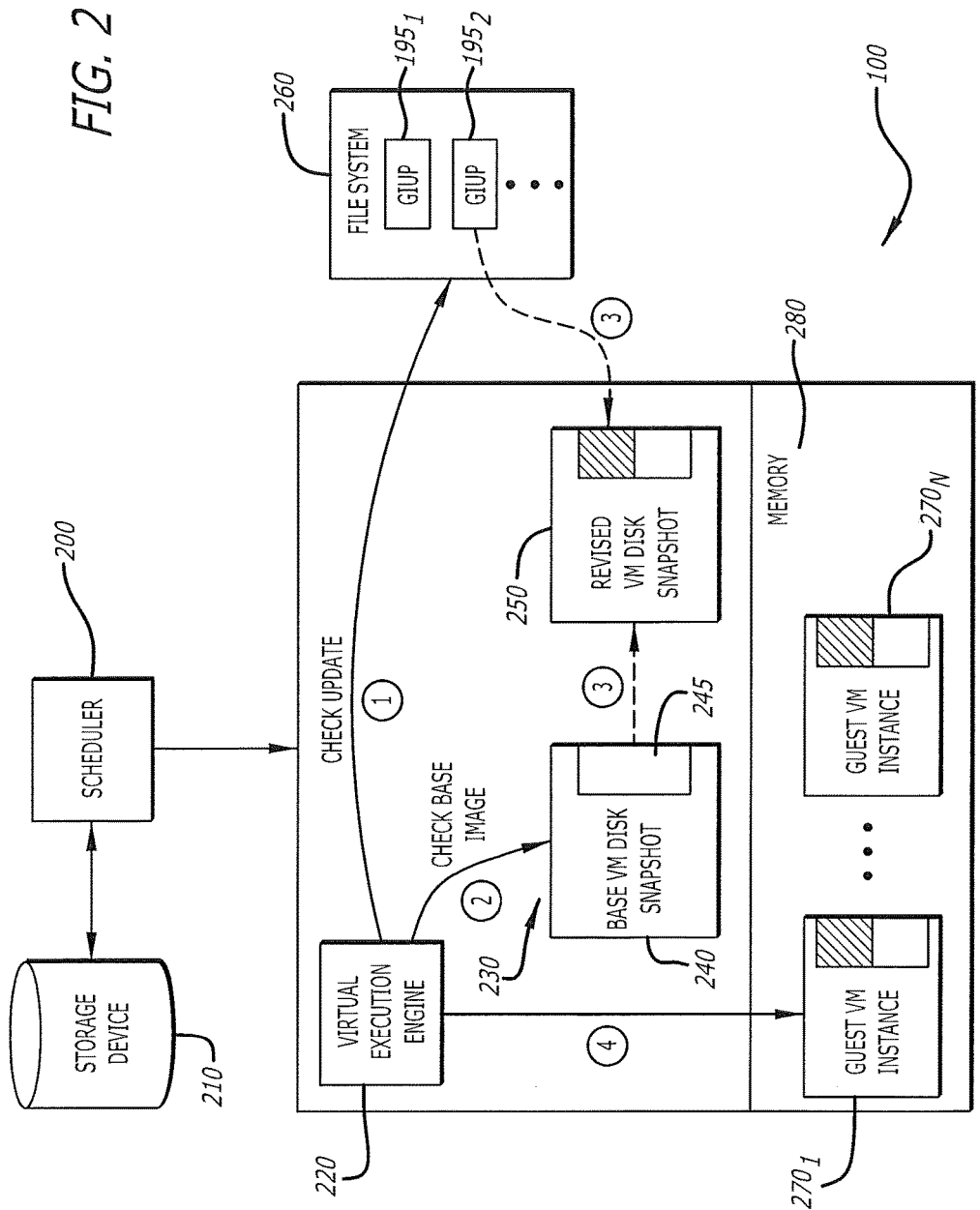
FIG. 2 is an exemplary block diagram of a logical representation of the network device of FIG. 1 supporting a virtualized malware detection environment.

Referring now to FIG. 2, an exemplary block diagram of a logical representation of the network device 100 of FIG. 1 is shown. Prior to instrumenting one or more virtual machines to analyze an object for malware, logic 200 with the network device 100, referred to as a "scheduler," accesses a storage device 210 that maintains one or more objects awaiting processing by at least the data analysis engine 175. The scheduler 200 may be a software component executed by the processor 110 of FIG. 1 or a hardware component that is part of the processor 110. Once an object is selected for processing and the object is deemed "suspicious," namely the probability of the object being associated with a malicious attack exceeds a threshold probability, the scheduler 200 notifies logic 220 within the dynamic analysis engine 175 of an upcoming analysis of the suspicious object to determine if the object is potentially malicious. This logic 220, referred to as a "virtual execution engine," is responsible for managing VM disk snapshot updates within the VM disk image, loading of VM disk images into memory, and controlling instantiation of one or more virtual machines for analysis of the suspicious object.

More specifically, a "current" VM disk snapshot 230 may correspond to either a base VM disk snapshot 240 alone (without a guest image update package installed) or a revised VM disk snapshot 250. Both of these types of VM disk snapshots include (i) current state information of a file system 260 to be utilized by a guest VM instance instantiated using the current VM disk snapshot, and (ii) state information of contents and settings within memory allocated for that guest VM instance. As shown, the base VM disk snapshot 240 features a contiguous storage area 245 (e.g., disk blocks) for receipt of a guest image update package $195_i$ (i=1, 2 . . . ) that may be provided to the network device 100 for updating the current VM disk snapshot 230. The contiguous storage area 245 may be "empty" (i.e., no valid data being stored) or may include a default file that is partially or entirely overwritten by the guest image update package $195_1$ (i=1) to produce the revised VM disk snapshot 250. Thereafter, the revised VM disk snapshot 250 is used for the instantiation of one or more guest VM instances 2701-270N within the dynamic analysis engine 175 prior to analysis of the object.

As shown in FIG. 2, upon activation, the virtual execution engine 220 monitors the file system 260 for a presence of one or more guest image update packages $195_1$-$195_M$ (operation 1) If so, subsequent monitoring may involve (i) a first determination whether the current VM disk snapshot 230 loaded in memory is a revised VM disk snapshot, and if so, (ii) a second determination whether the revised VM disk snapshot 250 includes the most recent guest image update package (i.e., guest image update package $195_2$). The second determination may involve a comparison of particular information within a the portion of the contiguous storage area 245 (e.g., version number of the guest image update package $195_1$, timestamp, etc.) to corresponding content within the most recent guest image update package $195_2$ (e.g., version number, timestamp, etc.). It is contemplated that the content of the most recent guest image update package $195_2$ may be extracted from the package $195_2$ or read from a separate record within the file system 260.

As shown, if the current VM disk snapshot 230 is the base VM disk snapshot 240 with the contiguous storage area 245 being "empty" or including the default file (operation 2), the virtual execution engine 220 combines a guest image update package $195_2$ with the base VM disk snapshot 240 to produce the revised VM disk snapshot 250 (operation 3). It is contemplated that the amount of memory allocated for the contiguous storage area 245 may be altered with updates of the base VM disk snapshot 240. Such updates may occur when entire new VM disk images are updated.

If the current VM disk snapshot 230 is a revised VM disk snapshot that includes an older guest image update package (e.g., update package 195$_1$), the virtual execution engine 220 updates the current VM disk snapshot 230 within the VM disk image. As shown in FIG. 2, responsive to detecting that the guest image update package 195$_2$ is more recent than the guest image update package 195$_1$ that is currently associated with the current VM disk snapshot 230, the virtual execution engine 220 determines if the base VM disk snapshot 240 is available (operation 2). If so, the virtual execution engine 220 combines the guest image update package 195$_2$ with the base VM disk snapshot 240 to produce the revised VM disk snapshot 250 (operation 3). Alternatively, although not shown, responsive to detecting that the guest image update package 195$_2$ is more recent than the guest image update package 195$_1$ stored in the contiguous storage area 245 of the current VM disk snapshot 230, the virtual execution engine 220 overwrites the guest image update package 195$_1$ in the current VM disk snapshot 230 with the guest image update package 195$_2$ to produce the revised VM snapshot 250.

Additionally, the virtual execution engine 220 controls the storage of the VM disk image including the revised VM disk snapshot 250 into memory 280 and subsequent instantiation of guest VM instances using the revised VM disk snapshot 250 for analysis of objects for malware until the virtual execution engine 220 is reactivated (operation 4). The activation and/or reactivation of the virtual execution engine 220 may be accomplished in response to rebooting of the network device 100, receiving of notification of an object for analysis by the scheduler 200, creating of a new entry of a file system 260 that is associated with a guest image update package, or the like.

IV. VM Disk Image Update and Guest Image Update Package

Referring to FIG. 3A, an exemplary embodiment illustrating a modification of the current VM disk snapshot 230 with a guest image update package (e.g., guest image update package 195$_2$) is shown. Herein, a VM disk image 300 includes the current VM disk snapshot 230, which may correspond to the base VM disk snapshot 240 of FIG. 2 with the contiguous storage area 245 being "empty". The contiguous storage area 245 is sized for storage of the guest image update package 195$_2$. The guest image update package 195$_2$ is provided subsequent to receipt of the VM disk image 300, which included the current VM disk snapshot 230. The guest image update package 195$_2$ may be provided to the network device over a different transmission medium than used to provide the VM disk image 300. For example, the VM disk image 300 including the current VM disk snapshot 230 may be provided through a first communication path 320 (e.g., pushed or pulled from a dedicated, on-premises server controlled by a provider of the VM disk image) while the guest image update package 195$_2$ may be provided through a second communication path 325 different from the first communication path 320 (e.g., cloud services).

Herein, as shown in FIG. 3A, the contiguous storage area 245 may be empty (as shown) or may include a collection of data (referred to as a "default file") that is partially or entirely overwritten by the guest image update package 195$_2$ in response to a triggering event. The triggering event may include, but is not limited or restricted to a particular type of operational state change experienced by the network device such as a reboot condition, installation of a new VM disk image (e.g., updated base VM disk snapshot install), restarting of the virtual execution engine 220 of FIG. 2 that controls the VM disk snapshot update, or the like. Following the triggering event, a determination is conducted that the contiguous storage area 245 is empty or includes a default file, which may include a comparison (or multiple comparisons) to content at a particular location in the contiguous storage area 245 to a particular location in the guest image update package 195$_2$. In response that an update is warranted, a modification of the current VM disk snapshot 230 occurs prior to loading a VM disk image, which would include a revised VM disk snapshot 250 having the guest image update package 195$_2$, into memory that is accessed for instantiation of one or more guest VM instances to analyze a suspect object.

It is contemplated that, in certain situations as shown in FIG. 3B, the current VM disk snapshot 230 may correspond to the revised VM disk snapshot 250 of FIG. 2. The current VM disk snapshot 230 would already include the guest image update package 195$_1$ placed in the contiguous storage area 245. In response to a triggering event that initiates a check of the file system 260 for guest image update packages, such as a newly added guest image update package 195$_2$ for example, the virtual execution engine 220 of FIG. 2 determines whether the guest image update package 195$_2$ differs from the guest image update package 195$_1$ that is currently part of the current VM disk snapshot 230. This determination may involve a comparison (or multiple comparisons) of particular content that is expected to reside in the guest image update package 195$_1$ and the guest image update package 195$_2$. Alternatively, the comparison (or multiple comparisons) of the particular content contained in these packages 195$_1$-195$_2$ that are stored at another storage location (e.g., as a record in the file system 260).

For instance, as an illustrative example, the determination may involve an analysis of the version numbers associated with the guest image update packages 195$_1$ and 195$_2$. If the guest image update package 195$_2$ is a more recent version than the guest image update package 195$_1$, the base VM disk snapshot may be fetched and the guest image update package 195$_2$ is collectively stored with the base VM disk snapshot 240 to create the revised VM disk snapshot 250 that now operates as the current VM disk snapshot 300. Alternatively, if the guest image update package 195$_2$ is a more recent version than the guest image update package 195$_1$, the guest image update package 195$_1$ within the current VM disk snapshot 300 may be overwritten with the guest image update package 195$_2$ to create the revised VM disk snapshot 250 that now operates as the current VM disk snapshot 300, as shown in FIG. 3B.

Referring now to FIG. 4, an exemplary embodiment of a logical representation of a guest image update package (e.g., guest image update package 195$_2$) of FIGS. 3A-3B is shown. For this embodiment, the guest image update package 195$_2$ includes meta information 400 along with one or more references to software components that may fall within any of the following software component categories, including: (a) an image launcher 410, (b) environment updates 420, (c) detection updates 430, (d) analytic tool updates 440, (e) plugin updates 450, (f) application updates 460, configuration/file directory updates 470, or the like. Each of these software components may be updates to software components originally contained in the base VM disk snapshot and/or new software components that modify or enhance the functionality of the virtual guest instance instantiated by a VM disk snapshot including the guest image update package $195_2$.

Herein, the image launcher 410 is a software component that, operating in accordance with rules set forth in the meta information 400, determines which of the software components referenced by or included within the guest image update package $195_2$ are used to instantiate one or more virtual guest instances for analysis of a suspicious object. More specifically, the rules of the meta information 400 may identify a first set of software components of the update component categories 420-460 that are used for malware detection independent of object type, and one or more other sets of software components of the update component categories 420-460 that are object type specific. At run-time, the image launcher 410 loads the first set of software components, and once the type of object for analysis is known prior to analysis, at least a second set of software components used for malware detection for the type of object under analysis is loaded.

In order to address recently detected evasive behaviors by malware, the image launcher 410 may be included as part of the guest image update package $195_2$. According to one embodiment of the disclosure, the image launcher 410 may be configured to perform different activities for loading an object into an application operating as part of the instantiated VM differently than those activities conducted by a prior image launcher, especially when the current VM disk snapshot including the image launcher 410 is a modification of a prior revised VM disk snapshot. These different activities, which may include simulated user interaction (e.g., mouse movement or clicks, password or other data entry, etc.) or processing procedures, are designed to quickly address detected activation delays or other evasive behaviors by malware. For instance, generating the guest VM instance, the image launcher 410 may be configured to update software components associated with malware detection that cause the virtual guest instance to perform a different user interaction pattern when processing a suspect object to actuate or trigger observable behavior by the object. As an alternative embodiment, the image launcher 410 may be a portion of one or more software components to replace the image launcher 410 that is part of the base VM disk snapshot.

As shown in FIG. 4, the guest image update package $195_2$ may include software components that are categorized as environment updates 420. Each of these software components is able to alter the logical state of the guest virtual instance. Each of these environmental factors may be checked by advanced malware so that their update is intended to facilitate detection and avoid evasion by the malware. As an illustrative example, a first (environment update) software component may be configured to alter a browser history or the registry differently than a corresponding default software component that is part of the base VM disk snapshot or a corresponding software component that is part of a different guest image update package (e.g., update package $195_1$). As another illustrative example, a second (environment update) software component may be configured to alter a computer name or a listing of installed applications.

Referring still to FIG. 4, each software component of the guest image update package $195_2$ associated with the detection update type 430 may alter a prescribed algorithm or an entire software module used by a VM (instantiated by a VM disk snapshot including the guest image update package $195_2$) for detecting whether an object under analysis is malicious (malware detection). As an illustrative example, a first (detection update) software component may be configured as a new version of heap spray or keylogger detection software. As another illustrative example, a second (detection update) software component may be configured to alter a detection algorithm for a particular type of object, such as a particular type of application (e.g., PDF, Microsoft® Office® document, etc.).

As further shown in FIG. 4, the guest image update package $195_2$ may include software components that are categorized as analytic tool updates 440. Each of these software components may be a pre-analysis software tool or a monitoring/detection tool or a post-analysis software tool. As a pre-analysis software tool, the software component is loaded before processing of the object within the virtual guest instance so as to assist in the analysis of the behaviors of the object, where such analysis may be used in determining whether or not the object is potentially malicious. As a monitoring/detection tool, the software component may be configured to setup the environment for detection, detect/monitor activity during analysis of the object, and perform analysis of logged activity. As a post-analysis software tool, the software component may be loaded after processing of the object within the virtual guest instance has begun to assist in analytics of the monitored information captured during such processing. For instance, the software component may deploy a certain aggregation scheme for subsequent forensic analyses.

In FIG. 4, the guest image update package $195_2$ may include software components that are categorized as plugin updates 450 and/or application updates 460. In particular, the guest image update package $195_2$ may provide a most recent version of a plugin or an application in response to the release of this version occurring after the base VM disk snapshot was provided as part of the VM disk image or the latest update guest image update package was provided. The meta information 400 within the guest image update package $195_2$ may include rules that impose conditions with respect to deployment of the plugin update software components 450 and/or application software components 460.

Lastly, shown FIG. 4, the guest image update package $195_2$ may include software components that are categorized as configuration/file directory updates 470, which will contain information about the guest image update package $195_2$. This information may indicate which tools and/or detection modules are being updated, added, or removed. This information may further contain environmental updates, which may require addition and/or removal of files or directories. Also, the configuration/file directory updates 470 may include one or more additional kernel modules, which can be loaded and are invoked by preloaded kernel modules. This allows for the updating of kernel functionality.

V. Virtual Guest Instance Instantiation

Figure 5:
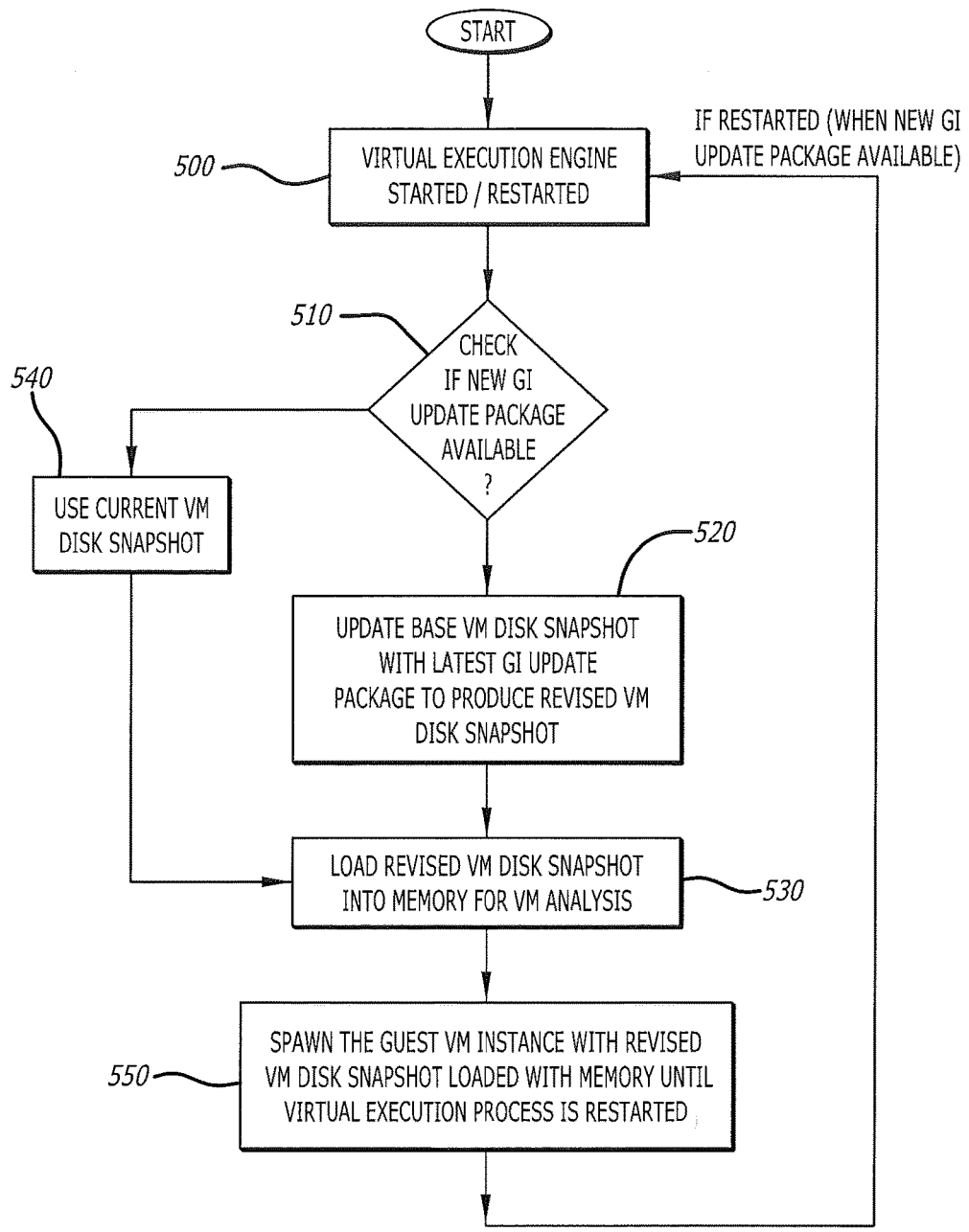
FIG. 5 is an exemplary embodiment of a flowchart of the operations of logic within the dynamic analysis engine in formulating the revised VM disk snapshot and instantiating different guest VM instances based on the revised VM disk snapshot.

Referring to FIG. 5, an exemplary embodiment of a flowchart of the operations of logic within the dynamic analysis engine to formulate the revised VM disk snapshot and spawn different virtual guest instances of the VM instantiated by the revised VM disk snapshot is shown. Herein, responsive to a triggering event (e.g., activation), the virtual execution engine determines if a new guest image update package is available (see blocks 500 and 510). Upon determining that a new guest image update package is available, the current VM disk snapshot may be updated with the new guest image update package to produce a revised VM disk snapshot (block 520). This determination may involve comparison of content (e.g., version number, timestamp, etc.) extracted from the new guest image update package to information residing within a portion of the contiguous storage area within the current VM disk snapshot or data representative of that information being maintained separately from the contiguous storage area. Alternatively, the determination may involve comparison of data representative of the content within the new guest image update package that extracted and maintained separate from the new guest image update package with information residing within the portion of the contiguous storage area within the current VM disk snapshot or data representative of that information being maintained separately from the contiguous storage area.

Thereafter, the VM disk image with the revised VM disk snapshot is loaded into memory for use in instantiating guest VM instances for malware detection analysis (blocks 530 and 550). Alternatively, upon determining that no new guest image update package is available, the current VM disk snapshot is continued for use in instantiating the virtual guest instance (blocks 540 and 550).

Figure 6:
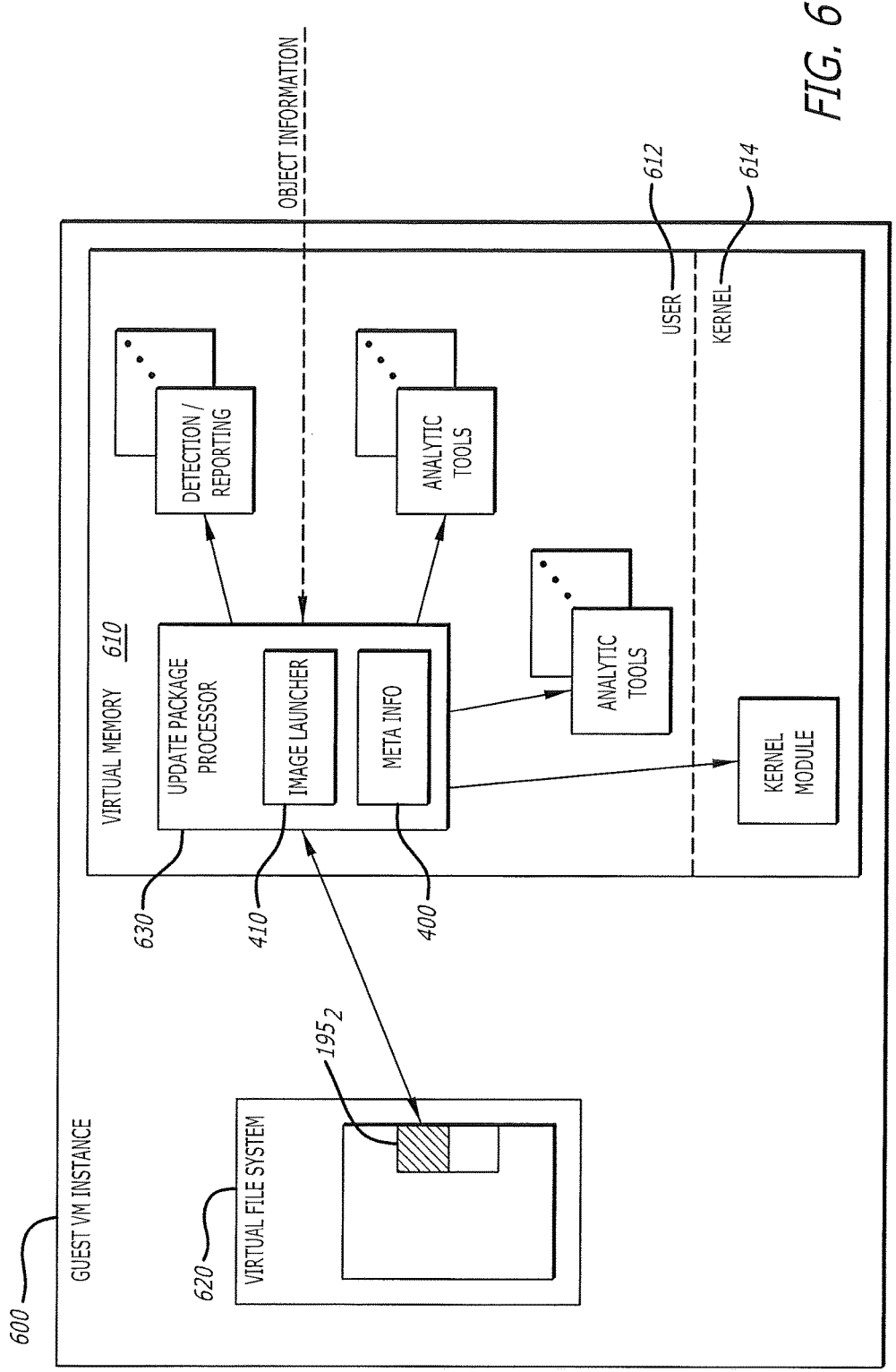
FIG. 6 is an exemplary embodiment of a user and kernel space of a guest VM instance instantiated with the revised VM disk snapshot that includes the guest image update package of FIG. 4.

Referring now to FIG. 6, an exemplary embodiment of a guest VM instance 600 that includes virtual memory 610 (user space 612 and kernel space 614) and a virtual file system 620 is shown. First, the guest VM instance 600 is at least partially instantiated using a base VM disk snapshot in which an update package processor 630 is loaded into the user space 612. The update package processor 630 is configured to continuously monitor a particular region within the contiguous storage area of the current VM disk snapshot stored on the virtual file system 620. This particular region corresponds to a portion of the file system associated with the base VM disk snapshot that is allocated for the guest image update package 195$_2$.

In response to detecting certain data at the particular region that signifies the presence of the guest image update package 195$_2$, the update package processor 630 creates a mounted directory (or virtualized disk) of the software component updates within that guest image update package for storage in a virtual file system 620 of the guest VM instance 600. The update package processor 630 further coordinates installation of the image launcher 410. According to one embodiment of the disclosure, the image launcher 410 is installed as part of the update package processor 630. After installation, the image launcher 410 operates to obtain stored meta information 400 that is part of the guest image update package 195$_2$. During processing of the stored meta information, the image launcher 410 accesses content within the directories to locate the application updates, plugin updates, tool updates, etc. These application updates, plugins, tool or the like are fetched by the image launcher 410 and installed as part of the guest VM instance 400. Hence, specific software components of the guest VM instance 400 may be updated without requiring an update of the entire VM disk image.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for updating a virtual machine disk snapshot for use in instantiating one or more virtual guest instances for malware detection, the method comprising:

detecting a guest image update package that comprises information for updating one or more software components included in a first storage area of the virtual machine disk snapshot, the virtual machine disk snapshot includes a base virtual machine disk snapshot including a runtime state for one or more pre-launched software components and the first storage area;

determining whether the guest image update package is contained in the first storage area that is part of the virtual machine disk snapshot; and responsive to determining that the guest image update package is more recent than content contained in the first storage area, inserting the guest image update package into the first storage area to generate a revised virtual machine disk snapshot that includes the one or more updated software components.

2. The computerized method of claim 1, wherein the first storage area being storage included as part of the base virtual machine disk file.

3. The computerized method of claim 1, wherein the detecting of the guest image update package comprises an analysis of content within a file system for any guest image update packages in response to a triggering event.

4. The computerized method of claim 3, wherein the triggering event includes a first type of operational state change experienced by a network device including the virtual machine disk snapshot.

5. The computerized method of claim 4, wherein the first type of operational state change experienced by the network device includes a reboot condition occurring for the network device.

6. The computerized method of claim 4, wherein the first type of operational state change experienced by the network device includes installation of a virtual machine disk image including the virtual machine disk snapshot.

7. The computerized method of claim 1, wherein the determining whether the guest image update package is contained in the first storage area comprises comparing content from a first portion of the guest image update package to selected information within a portion of the first storage area that is part of the virtual machine disk snap shot.

8. The computerized method of claim 7, wherein the first portion of the guest image update package includes a version number assigned to the guest image update package and the selected information within the portion of the first storage area includes an area of the first storage area that is to contain a version number for any guest image update package contained with the portion of the first storage area.

9. The computerized method of claim 1, wherein the determining whether the guest image update package is currently contained in the first storage area comprises comparing data representative of one of a version number or timestamp assigned to the guest image update package to data representative of information contained within a selected area of the first memory that is part of the virtual machine disk snapshot.

10. The computerized first of claim 1, wherein the guest image update package comprises an image launcher and meta information that includes rules processed by the image launcher to control a loading of software components to update software components that are part of the virtual machine disk snapshot.

11. A non-transitory computer readable medium including a virtual machine disk snapshot that, when processed by a hardware processor, generates an update of the virtual machine disk snapshot in real-time during a malware analysis of an object, the non-transitory computer readable medium comprising:

an update package processor to monitor a first area of a virtual file system that is part of the virtual machine disk snapshot and is operating as a memory area for a guest image update package newly added to the virtual file system, the virtual machine disk snapshot comprises a base virtual machine disk snapshot including state information for one or more software components and the memory area; and an image launcher installed into the virtual machine disk snapshot after detection of the guest image update package by the update package processor, the image launcher to receive meta information from the guest image update package where the meta information includes rules that control installation of the one or more software components of the guest image update package as updates to the virtual machine disk snapshot to produce a revised virtual machine disk snapshot.

12. The non-transitory computer readable medium of claim 11, wherein the update package processor to detect the guest image update package has been newly added to the virtual file system comprises a comparison of content from a first portion of the guest image update package to selected information within a portion of the first area being part of the virtual machine disk snapshot.

13. The non-transitory computer readable medium of claim 12, wherein the first portion of the guest image update package includes a version number assigned to the guest image update package and the selected information within the portion of the first area includes a version number for any guest image update package contained with the portion of the first area.

14. The non-transitory computer readable medium of claim 12, wherein the image launcher is part of the guest image update package includes a version number assigned to the guest image update package and the selected information within the portion of the first storage area includes a version number for any guest image update package contained with the portion of the first storage area.

15. The computerized method of claim 1, wherein the first storage area is a continuous storage area of the virtual machine disk snapshot.

16. A network device, comprising:
a hardware processor; and
a memory communicatively coupled to the hardware processor, the memory comprises a dynamic analysis engine that, when executed by the processor, performs an analysis of an object for malware, the dynamic analysis engine comprises one or more virtual machine (VM) instances each including a guest VM instance, wherein
the guest VM instance is instantiated in accordance with a virtual disk image including a VM disk snapshot, the VM disk snapshot includes a first VM disk snapshot including state information for one or more software components and a first storage area including content that can be updated by logic operating within the dynamic analysis engine prior to analysis of the object for malware, wherein the VM disk snapshot being updated by at least detecting a guest image update package that includes information for updating the one or more software components included as part of the first VM disk snapshot, determining whether the detected guest image update package is currently contained in the first storage area that is part of the first VM disk snapshot, and responsive to determining that the guest image update package is more recent than content currently contained in the first storage area, inserting the guest image update package into the first storage area that is part of the first VM disk snapshot to generate a revised VM disk snapshot that includes the one or more updated software components for use in instantiating the guest VM instance with the revised VM disk snapshot.

17. The network device of claim 16, wherein the logic to detect the guest image update package by at least analyzing content with a file system for any guest image update packages in response to a triggering event.

18. The network device of claim 17, wherein the triggering event includes a first type of operational state change experienced by the network device.

19. The network device of claim 18, wherein the first type of operational state change experienced by the network device includes a reboot condition occurring for the network device.

20. The network device of claim 18, wherein the first type of operational state change experienced by the network device includes installation of a VM disk image including the first VM disk snapshot.

21. The network device of claim 16, wherein the determining by the logic whether the guest image update package is currently contained in the first storage area comprises comparing content from a first portion of the guest image update package to selected information within a portion of the first storage area that is part of the first VM disk snapshot.

22. The network device of claim 16, wherein the first storage area is a continuous storage area of the virtual machine disk snapshot.

* * * * *